Dec. 31, 1957     W. H. HASENKAMP     2,818,103
METAL TAPE STRAIGHTENING DEVICES
Filed July 2, 1956
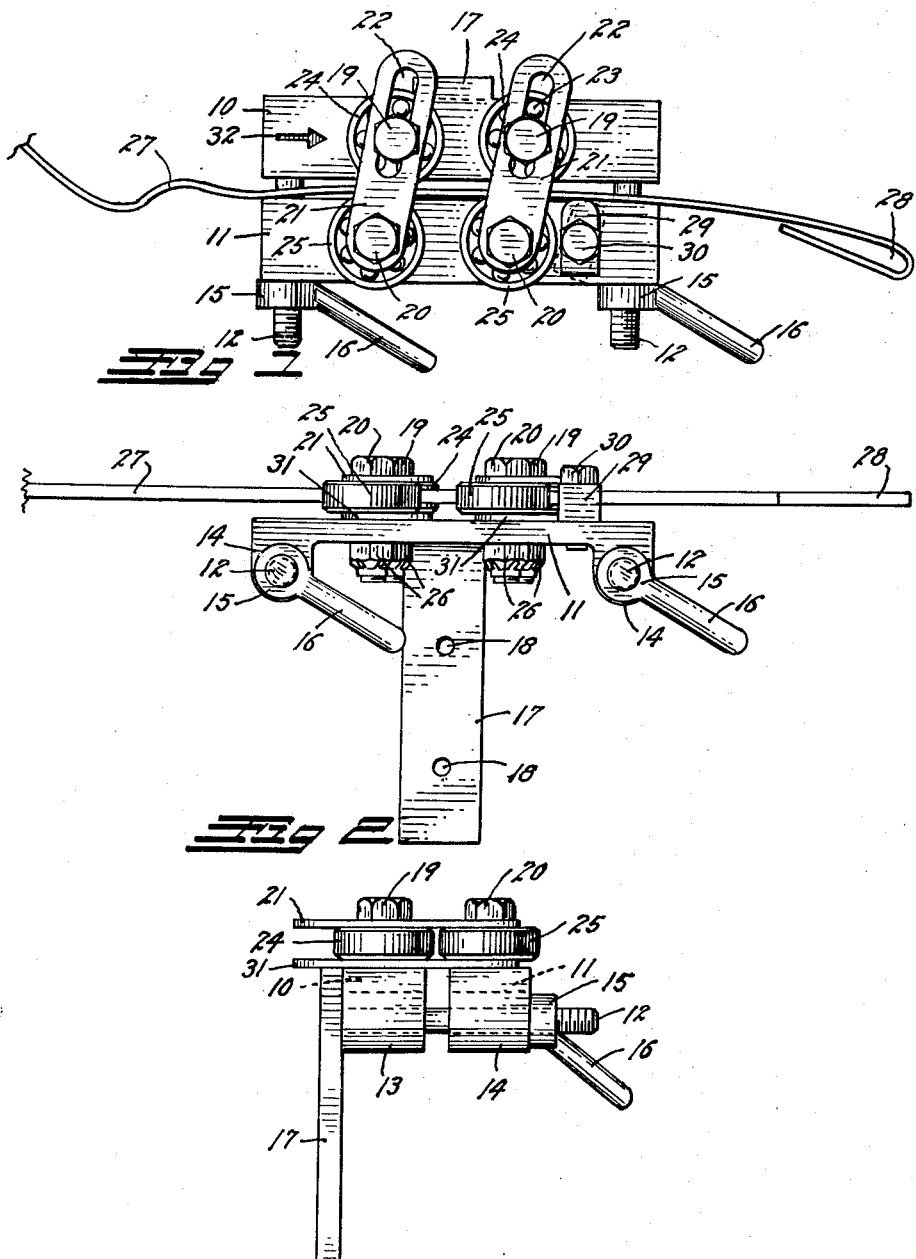
INVENTOR.
WILLIAM H. HASENKAMP
BY
ATTORNEY

2,818,103
METAL TAPE STRAIGHTENING DEVICES

William H. Hasenkamp, Boulder, Colo., assignor of fifty percent to Joseph F. Kent, Boulder, Colo.

Application July 2, 1956, Serial No. 595,201

3 Claims. (Cl. 153—107)

This invention relates to an electrician's fish tape straightening tool. Electricians' fish tapes consist of an elongated tape or strip of mild steel designed to be forced through electrical conduits and then drawn upon to draw the wires into and through the conduits. The fish tapes are available in various lengths up to one hundred feet. It is seldom that the entire tape is unreeled, for most of the work consists of relatively short runs of from eight to twenty feet. As a result the extremity of the tape which receives maximum use becomes bent and kinked to such an extent as to be substantially unusable.

The principal object of this invention is to provide a simple tool which can be carried in the usual tool box and which can be clamped in a vise or attached to any convenient support, and which can be used to quickly and easily remove the kinks and bends from the fish tape to restore it to its original smooth, continuous contour.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved fish tape straightening tool;

Fig. 2 is a front view thereof; and

Fig. 3 is an end view thereof.

The improved tool comprises a horizontal fixed tool bar 10 and a similar horizontal movable tool bar 11 adjustably secured together by means of a pair of threaded studs 12 which are threaded into or are otherwise fixedly mounted in lug bosses 13 formed below the extremities of the first tool bar 10. The adjustable tool bar 11 is slidably mounted on the studs 12, the latter passing through similar lug bosses 14 formed below the extremities of the tool bar 11.

The tool bar 11 can be urged toward the fixed tool bar 10 by means of adjusting nuts 15, there being one nut threaded onto each stud. The nuts are preferably provided with suitable turning wings 16 so as to eliminate the necessity for a wrench.

The fixed tool bar 10 is provided with a tool post 17 welded or otherwise permanently secured to the fixed tool bar 10 and extending vertically downward from one side of the latter. The tool post 17 is particularly designed to be clamped between the jaws of any conventional vise. It is, however, also provided with nail holes 18 by means of which it may be nailed or screwed to any suitable supporting structure.

Two spaced-apart, aligned bearing bolts 19 are threaded downwardly through the fixed tool bar 10, and two similar bearing bolts 20 are threaded downwardly through the adjustable tool bar 11. The bearing bolts 19 and 20 are locked in position in their respective tool bars by means of suitable lock nuts 26.

An upper retaining strap 21 and a lower retaining strap 31 are pivotally mounted on each of the bearing bolts 20, and extend forwardly about one of the bearing bolts 19. The straps 21 and 31 are provided with elongated bolt openings 22 through which the bearing bolts 19 pass.

A conventional ball bearing is mounted on each of the bearing bolts 19 and 20 intermediate the straps 21 and 31 thereon. Such a bearing is a conventional unitary element consisting of an inner ball race, which slips over the bearing bolt, surrounded by bearing balls 23 which concentrically and rotatably support an outer ball race. On the drawing the outer races on the bolts 19 are designated by the numeral 24 and the outer races on the bolts 20 are designated by the numeral 25.

The improved tool is designed to straighten the kinks from an electrician's fish tape, such as illustrated on the drawing at 27. Such tapes are usually provided with a turned-back hooked extremity, such as indicated at 28.

In use, the post 17 is fixedly mounted as above described and the nuts 15 are loosened to allow the tool bar 11 to be drawn away from the tool bar 10 sufficiently to allow the hook 28 to be passed between the ball races 24 and 25 and between the guide straps 21 and 31. The nuts 15 are now tightened to cause the ball races 25 to engage and flex the tape 27 against the ball races 24. The tape 27 is now drawn forwardly between the opposed ball races and the latter act to flex the tape alternately back and forth to roll out and straighten any kinks which may be in the tape.

It has been found that with the above-described structure the tape will exit from between the ball races with all kinks removed. An objectionable arcuate bend is formed in the tape, however, as it leaves the final race 25. This objectionable bend has been eliminated in the improved tool by means of a backing block 29 which is mounted on the adjustable tool bar 11 in any desired manner, such as by means of a clamping cap screw 30. The block 29 is formed with a rounded extremity against which the tape 27 rides as it is flexed by the final race 24 so as to prevent the tape from swinging toward the bar 11 so that it will exit from the tool in a substantially straight condition.

It is preferred to place or indent an indicating arrow 32 on one of the tool bars to indicate to the user the proper direction in which the tape should be pulled through the tool.

It will be noted that the bearing bolts 19 are offset forwardly from the bearing bolts 20 in the direction of travel of the tape so that the tape is first flexed against the first race 25 toward the bar 11, then flexed against the first race 24 toward the bar 10, thence flexed against the second race 25 toward the bar 11, thence against the second race 24 toward the bar 10. This alternating flexing removes all bends and kinks and delivers the tape in a straight condition.

The principal purpose of the straps 21 is to guide the tape 27 accurately between the ball races and prevents the tape from slipping therefrom while being pulled through the tool. The degree of straightening action and the resistance to the pull on the tape can be regulated by adjustment of the nuts 15.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A fish tape straightening tool comprising: a fixed horizontal tool bar; a tool post secured to and extending vertically from said fixed tool bar for supporting the latter from any suitable supporting device; a threaded stud extending horizontally sideward from adjacent each extremity of the fixed tool bar; an adjustable tool bar slidably mounted on said studs; means on said studs for urging said adjustable tool bar toward said fixed tool bar; a first pair of bearing bolts mounted on said fixed tool bar in spaced-apart relation; a second pair of equally-spaced bearing bolts mounted on said adjustable tool bar, the bolts of said second pair being offset longitudinally from the bolts of the first pair; two guide straps extending between each of the bolts of the first pair and each of the bolts of the second pair; and a rolling device rotatably mounted on each bearing bolt between the two guide straps thereon, there being a slotted bolt-receiving opening formed in each guide strap for receiving one of said bearing bolts, said slotted openings allowing said tool bars to be moved toward and away from each other without interference from said guide straps.

2. A fish tape straightening tool as described in claim 1 having a backing block device fixedly secured to one of said tool bars and positioned to slidably engage a fish tape as it exits from said rolling devices while being withdrawn from said tool.

3. A fish tape straightening tool as described in claim 2 having openings formed in said supporting post adapted to receive devices for attaching said post to a supporting element.

References Cited in the file of this patent

UNITED STATES PATENTS

| | | |
|---|---|---|
| 939,532 | Morton | Nov. 9, 1909 |
| 1,923,738 | McBain | Aug. 22, 1933 |
| 1,930,562 | Krueger | Oct. 17, 1933 |